J. H. Shireman.
Horse Rake.
No 1832 Reissued Dec. 6, 1864.
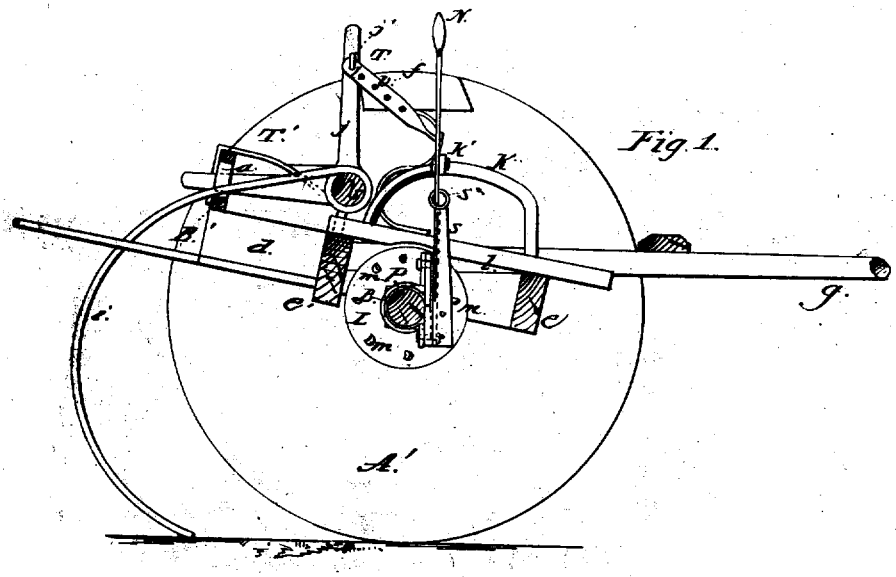
Fig. 2.
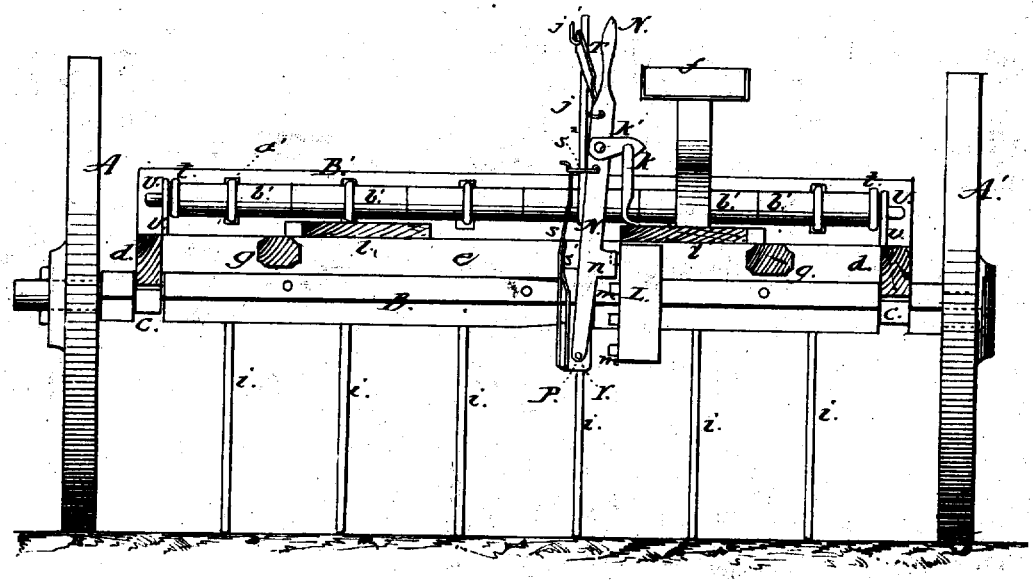

UNITED STATES PATENT OFFICE.

JOSEPH H. SHIREMAN, OF EAST BERLIN, PENNSYLVANIA.

IMPROVEMENT IN HORSE-RAKES.

Specification forming part of Letters Patent No. 36,426, dated September 9, 1862; Reissue No. 1,832, dated December 6, 1864.

*To all whom it may concern:*

Be it known that I, JOSEPH H. SHIREMAN, of East Berlin, in the county of Adams and State of Pennsylvania, have invented a new and useful Improvement in Horse Hay-Rakes; and I do hereby declare that the following is a full and exact description thereof, reference being had to the accompanying drawings and letters of reference marked thereon, like letters in the several figures indicating the same or analogous parts, and in which drawings—

Figure 1 is a longitudinal section, showing the attachment of the hand-lever to the axle of the rake; and Fig. 2 is a front sectional view of said lever, together with the main operating parts of the machine.

In the drawings, A indicates a wheel which revolves loosely upon the axle B, and A′ a wheel firmly attached to said axle and revolving with it. Collars, as at *c c*, are connected to the under side of beams *d d*, which constitute the sides of the main frame of the machine, said beams being connected with transverse beams *e e′* in front and in rear of the axle, as shown, thus forming a support for the driver's seat *f*, thills *g g*, perforated tooth-board B′, rake-teeth *i*, elbow-lever *j*, and inclined "way" *k*. The main frame and parts supported thereon are thus sustained by and articulate upon the axle by the collars *c c*. Planks *l l′* are secured to the cross-beams *e e′*, as shown, the latter one, *l′*, serving as an immediate support to the driver's seat *f*, and also to the inclined way *k*.

The driver's seat, it will be seen, is situated at one side of a point central of the length of the axle B, and near the wheel A′, which is permanently attached to the axle, so that the weight of the driver, when occupying the seat, will mainly be thrown upon said wheel. By this means the firmness of the "tread" of the wheel A′ is increased, and any liability of its slipping upon the ground when the rake-teeth are charged with a heavy draft of hay is avoided.

On the axle B, beneath the driver's seat, a cog-wheel, L, is permanently attached, so as to revolve with the wheel A′ and the axle. Cogs *m*, as shown, project from the working-face of said cog-wheel, and as the wheel A′ revolves engage with the lip *n* of the hand-lever N, thus compelling said lever to articulate on said axle and move forward in the direction of the rotation of said wheel, as will be described. Nearly central of the length of the axle a loose collar, P, is made to embrace the axle, as shown, and articulates freely thereon. To this collar, as at *r*, the lower end of the hand-lever N is pivoted, so that it may be made to approach the cog-wheel L by the hand of the driver, or be drawn away therefrom by the action of springs *s* and *s′*, applied as shown, the main spring, *s*, at its upper end being connected to the hand-lever by the link $s^2$.

As represented, a perforated bar, T, connects the hand-lever with the upper limb of the elbow-lever *j*, which has its axis of motion on the bar or rod V, upon which the rake-teeth *i* articulate. The effective length of the bar T may at will be increased or diminished by inserting the hook *j′* of the elbow-lever *j* into either one of the perforations through said bar, as may be desired. The lower limb of the elbow-lever is made to project through an aperture, *a*, in the perforated or slotted tooth-board B′, through the slots of which, as at *a′*, the rake-teeth *i* pass, and within the range of which slots or apertures *a′* said teeth are permitted to rise and fall to accommodate themselves to inequalities of the ground without effecting an elevation of the tooth-board B′, through which they pass.

Rod V at its ends is supported by uprights *v v*, as indicated, said uprights being driven into or otherwise properly secured to the framing *d d*, as shown. This rod, as represented in the figures, passes through a series of rollers, *b′*, to which the inner ends of the rake-teeth are secured. Each one of said rollers plays loosely upon the rod V and independent of each other.

Hangers T′, as shown, support the perforated or slotted tooth-board B upon the rod V, the rear ends of the hangers T′ being attached at or near the ends of the tooth-board B′, and their forward ends, *t*, being perforated, so as to admit the rod V to pass through such ends, and be held by said rod in proper position, while at the same time they are permitted to articulate freely thereon. Thus the axis of motion of the tooth-board B is coincident or in line with the axis of motion of the teeth *i*, so that when the teeth are elevated by the rising of the tooth-board said teeth and board will describe the same movement or arc at the points where the teeth rest upon said board in its slots or perforations $a'$.

As the elbow-lever $j$ is also pivoted upon the rod V, it is evident that when the rake-teeth $i$ are elevated from the position shown in the drawings they will rise simultaneously and coincident with the board B′, through which they pass, and that as the said board and teeth have the same axis of motion the teeth, during such act of elevation, will simply rest upon the board B′, instead of being thrust longitudinally through the slots $a'$, thereby causing an increased draft of the machine. This state of rest of the teeth $i$ upon the board B′ is the same whether the latter is in the act of elevation or depression.

A catch, $k'$, is pivoted to the hand-lever N, so that when the hand-lever is made to approach the inclined way $k$ it will engage with the latter and hold the hand-lever in the position shown in Fig. 2.

We will suppose that the machine has gathered a desirable quantity of hay to form a windrow, and that the hand-lever is still occupying its normal vertical position, and with its lip $n$ out of contact with the cogs of the wheel L, and that the driver or operator is desirous of discharging the hay. To effect such discharge the driver will grasp the lever N with his right hand, and by drawing it toward him a proper distance the lip $n$ of the lever will be brought within the path of revolution of the cogs $m$ of the wheel L, and the catch $k'$, striking the inclined way $k$, will engage with it, as shown in Fig. 2. In this position of the hand-lever the continued rotation of the wheel A′ will turn the hand-lever on the axle B with a downward and forward movement until the catch $k'$ has traversed the face of the way $k$, and has also passed beyond the forward portion of said way, at which moment the tension of the springs $s$ and $s'$ will cause the lever to resume its original vertical position, thus freeing it from contact with the cog-wheel L.

It is evident that during such movement of the hand-lever the rake-teeth $i$ will be elevated upon and with the tooth-board B′ through the instrumentality of the elbow-lever $j$ and connecting-bar T, and that the time at which the rake-teeth will be permitted to fall back into the position shown in the drawings will depend upon the working length of the bar T, according as it is hooked to the elbow-lever $j$ in one or the other of its holes $v'$. It is also apparent that the driver, with a backward draw upon the hand-lever N, can, through the instrumentality of the connecting-bar T, elbow-lever $j$, and tooth-board B′, force the rake-teeth $i$ down to their work—an operation highly necessary, since, after the teeth shall have gathered a quantity of hay less than enough to warrant its discharge, the tendency of the teeth is to rise from the ground and not perform thorough work.

My improvements relate specially to that class of rakes in which the axle and one of the supporting-wheels thereon are employed as the means for discharging the gathered hay from the rake-teeth—that is to say, the power of the horses is transmitted through these devices to the rake-teeth, and made available for lifting the weight of the rake and its load during the act of freeing the teeth of the hay which has been collected by them. This being the character of my improvements, the utility of the pendent hangers, the tight wheel, and the driver's seat, all as described, will be evident.

Having thus described my invention, what I claim as new, and desire to secure by Letters Patent of the United States, is—

1. Suspending the hand-lever N upon the axle B, so that the former may articulate upon the latter, in the manner and for the purpose described.

2. The inclined way $k$, in combination with the hand-lever N, arranged and operating substantially in the manner and for the purpose set forth.

3. The perforated bar T, in combination with the hand-lever N, arranged and operating substantially in the manner and for the purpose set forth.

4. The arrangement of the driver's seat to one side of the center of the length of the continuously-rotating axle B, and in relation to the tight driving-wheel A′, lever N, inclined way $k$, and perforated bar T, in the manner and for the purpose set forth.

5. The arrangement of the hangers T′ of the tooth-board B′ on the same rod or shaft that the rake-teeth are supported and articulate upon, in combination with an axle which transmits the power of the team to the rake during the act of discharging the hay from the teeth, substantially as and for the purpose set forth.

6. The hangers T′ of the tooth-board B′, constructed and applied in connection with a rake which operates to discharge its load by the power of the team through the agency of the axle, substantially as set forth.

Witness my hand in matter of my application for reissue of patent for improved horse-rake.

J. H. SHIREMAN.

Witnesses:
R. T. CAMPBELL,
PETER HOOVER.